(12) United States Patent
Wang et al.

(10) Patent No.: US 10,688,654 B2
(45) Date of Patent: Jun. 23, 2020

(54) EXOSKELETON DEVICE FOR SUPPORTING ANTI-RADIATION PROTECTIVE CLOTHING

(71) Applicant: Southeast University, Nanjing (CN)

(72) Inventors: Xingsong Wang, Nanjing (CN); Shilong Wan, Nanjing (CN); Mingxing Yang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 16/470,565

(22) PCT Filed: Nov. 16, 2017

(86) PCT No.: PCT/CN2017/111247
§ 371 (c)(1),
(2) Date: Jun. 18, 2019

(87) PCT Pub. No.: WO2018/113458
PCT Pub. Date: Jun. 28, 2018

(65) Prior Publication Data
US 2020/0086478 A1    Mar. 19, 2020

(30) Foreign Application Priority Data

Dec. 20, 2016   (CN) .......................... 2016 1 1187319

(51) Int. Cl.
*B25J 9/00*        (2006.01)
(52) U.S. Cl.
CPC .................................. *B25J 9/0006* (2013.01)

(58) Field of Classification Search
CPC .................................. B25J 9/00; B25J 9/0006
USPC ......... 250/505.1, 506.1, 515.1, 516.1, 517.1, 250/518.1, 519.1
See application file for complete search history.

(56) References Cited

U.S. PATENT DOCUMENTS

| 4,254,341 A | * | 3/1981 | Herr ....................... A61B 6/107 |
| | | | 250/519.1 |
| 5,015,864 A | | 5/1991 | Maleki |
| 5,220,175 A | | 6/1993 | Cole |

(Continued)

FOREIGN PATENT DOCUMENTS

| CN | 204010714 U | 12/2014 |
| CN | 104269198 A | 1/2015 |

(Continued)

*Primary Examiner* — Nicole M Ippolito
(74) *Attorney, Agent, or Firm* — Bayramoglu Law Offices LLC

(57) ABSTRACT

An exoskeleton device for supporting anti-radiation protective clothing includes a shoulder mechanism, a waist mechanism and a leg mechanism. The shoulder mechanism includes a pair of back support rods, a fixed transverse rod and a guide member arranged between the back support rods, and a pair of flexible straps fixed to the back support rods. The waist mechanism includes waist support rods, a flexible waist strap installed on the waist support rods, and two straight cylindrical tension springs. The leg mechanism includes straight thigh support rods and automatic switching devices, with the straight thigh support rods being arranged at upper ends of the automatic switching devices, and the automatic switching devices being arranged between the straight thigh support rods and straight calf support rods.

5 Claims, 3 Drawing Sheets

(56) References Cited

U.S. PATENT DOCUMENTS

2009/0184269 A1* 7/2009 Rees .................... A61B 6/107
                                                    250/516.1
2013/0270462 A1* 10/2013 Beck ................... A61B 6/4423
                                                    250/516.1

FOREIGN PATENT DOCUMENTS

| CN | 104269199 A  | 1/2015  |
|----|--------------|---------|
| CN | 205751544 U  | 11/2016 |
| CN | 106493715 A  | 3/2017  |
| WO | 2012116030 A1| 8/2012  |

* cited by examiner

EXOSKELETON DEVICE FOR SUPPORTING ANTI-RADIATION PROTECTIVE CLOTHING

CROSS REFERENCE TO RELATED APPLICATIONS

This application is the national phase entry of International Application PCT/CN2017/111247, filed on Nov. 16, 2017 which is based upon and claims priority to Chinese Patent Application No. 201611187319.5, filed on Dec. 20, 2016 the entire contents of which are incorporated herein by reference.

TECHNICAL FIELD

The present invention relates to the technical field of medical instruments and relates to an exoskeleton device, and in particular, to a systemic exoskeleton that has an auxiliary support function.

BACKGROUND

In modern medical treatment, X-rays have become an important means adopted by a doctor to diagnose a condition of a patient and treat the patient. X-rays may cause certain adverse effects on a human body when penetrating the human body. The human body will suffer a certain radiation damage if it is exposed to excessive X-rays, causing a pathological change, even a cancer risk. Medical workers need to wear anti-radiation protective clothing for protection when performing radiodiagnosis and operations. However, the anti-radiation protective clothing contains a certain mass of lead, with a result that medical workers engaged in radiodiagnosis in the anti-radiation protective clothing cannot work conveniently and feel very tired, and may even suffer physical illness such as spondylopathy and lumbar spondylopathy.

SUMMARY

The technical problem to be solved by the present invention is to provide an exoskeleton device for supporting anti-radiation protective clothing. The device may be worn on a human body and support anti-radiation protective clothing worn on the human body without interfering with and influencing normal movement and actions of the human body, and when the human body bends down or squats, the exoskeleton device can have a function of passive assistance, and a support part in contact with the ground has shock absorption effects.

To solve the foregoing technical problem, the present invention adopts the following solution.

An exoskeleton device for supporting anti-radiation protective clothing includes the following members.

A shoulder mechanism worn on a shoulder includes a pair of back support rod, a fixed transverse rod and a guide member arranged between the back support rods, and a pair of flexible straps fixed to the back support rods, the guide member is located below the fixed transverse rod, left and right ends of the fixed transverse rod are respectively fixed to the back support rods at left and right sides, and left and right ends of the guide member are respectively slidably sleeved on the back support rods at the left and right sides.

A waist mechanism worn on a waist includes waist support rods, a flexible waist strap installed on the waist support rods, and two straight cylindrical tension springs with one of the ends thereof being respectively fixed to the left and right sides of the waist support rods, the back support rods are respectively fixed to front ends of the waist support rods through two middle-convex drum-shaped springs, the guide member is fixed to the front ends of the waist support rods through two spherical hinges that are disposed vertically and located between the two middle-convex drum-shaped springs, and the other ends of the straight cylindrical tension springs are respectively connected to an upper end of the spherical hinge above through a steel rope.

A leg mechanism worn on a leg includes straight thigh support rods and automatic switching devices, with the straight thigh support rods being arranged at upper ends of the automatic switching devices and the automatic switching devices being arranged between the straight thigh support rods and straight calf support rods, the leg mechanism further includes fasteners arranged on upper ends of the automatic switching devices, joint bearings arranged on lower ends of the fasteners, bearing supports arranged at lower ends of the joint bearings, sliding members arranged at lower ends of the bearing supports, sliding bearings arranged in the sliding members, upper hinges and lower hinges respectively hingedly connected to the fasteners and the sliding members, compression springs arranged between the upper hinges and the lower hinges and spring compression rods passing through the upper hinges, the compression springs, and the lower hinges in sequence, where lower ends of the straight thigh support rods and upper ends of the joint bearings are fixedly connected through upper thread rods, the upper thread rods pass through through holes in the fasteners, the lower ends of the joint bearings are rotatably installed on the bearing supports, rod caps are arranged at upper ends of the spring compression rods and nuts are installed on lower ends, and the upper hinges and the lower hinges are limited between the rod caps and the nuts of the spring compression rods; for the straight calf support rods arranged at the lower ends of the bearing supports, the straight calf support rods pass through insides of the sliding bearings, upper ends thereof are fixed in countersunk through holes of bases of the bearing supports through lower thread rods; straight sliding support rods are arranged inside the straight calf support rods and can slide up and down in the straight calf support rods, two corresponding installation holes are respectively formed in upper ends of the straight sliding support rods and upper ends of the sliding member, upper pin shafts and lower pin shafts are inserted into the two installation holes to fix the straight sliding support rods and the sliding member, and the sliding bearings are limited between the upper pin shafts and the lower pin shafts; sliding slots are formed in sides of the straight calf support rods, the upper pin shafts and the lower pin shafts pass through the installation holes of the sliding members in sequence, and the sliding slots and the straight sliding support rods in sequence, and slide up and down in the sliding slots.

Furthermore, the waist support rods and the straight thigh support rods are connected through spherical hinges, and the exoskeleton device further includes drum-shaped springs respectively fixed to two ends of each of the spherical hinges.

Furthermore, the exoskeleton device for supporting anti-radiation protective clothing further includes flexible thigh binding sleeves, respectively fixed to the straight thigh support rods.

Furthermore, the exoskeleton device for supporting anti-radiation protective clothing further includes flexible calf binding sleeves, respectively fixed to the straight calf support rods.

Furthermore, the exoskeleton device for supporting anti-radiation protective clothing further includes flexible anklebone binding sleeves, respectively hingedly connected to the straight calf support rods through anklebone rotating members.

Advantageous effects: compared with the prior art, the technical solution of the present invention has the following advantageous effects.

(1) The back support rods and the waist support rods are connected through spring hinge mechanisms, the spring hinge mechanisms are multi-degree-of-freedom hinge mechanisms, the drum-shaped springs can have supporting and resetting functions when a waist rotates horizontally and swings left and right, and the straight cylindrical tension springs can generate a tension to provide assistance effects when a human body bends over.

(2) A spring hinge mechanism is used at a hip joint connecting the waist support rods and the straight thigh support rods, and the spherical hinges can implement all actions of the hip joint and can provide assistance by using the springs when a human body bends over.

(3) The straight thigh support rods and the straight calf support rods are connected through the spherical hinges, the spherical hinges, the spring compression rods, and the sliding members form a spring sliding block hinge mechanism, the mechanism may implement a knee-joint bending action in a normal walking mode, and may further provide assistance for a knee-joint when the human body is in a standing situation, to reduce a burden on the human body in the anti-radiation protective clothing.

(4) The plantar support members are made of a bent metal rubber material, contain damping springs, and can reduce impact when feet touch the ground.

DETAILED DESCRIPTION OF THE INVENTION

The technical solution of the present invention will be described in detail with reference to the accompanying drawings.

Figure 1:
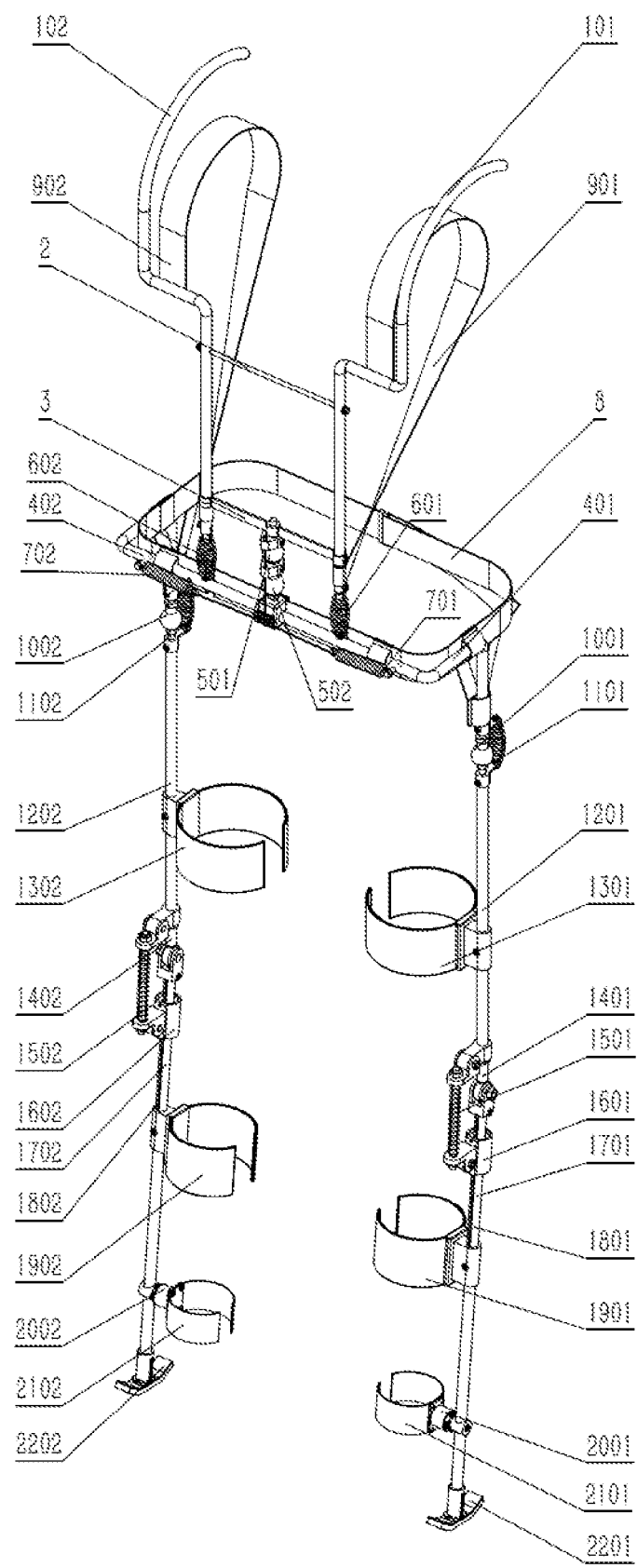
FIG. 1 is a schematic diagram of a whole three-dimensional structure according to the present invention.
Figure 2:
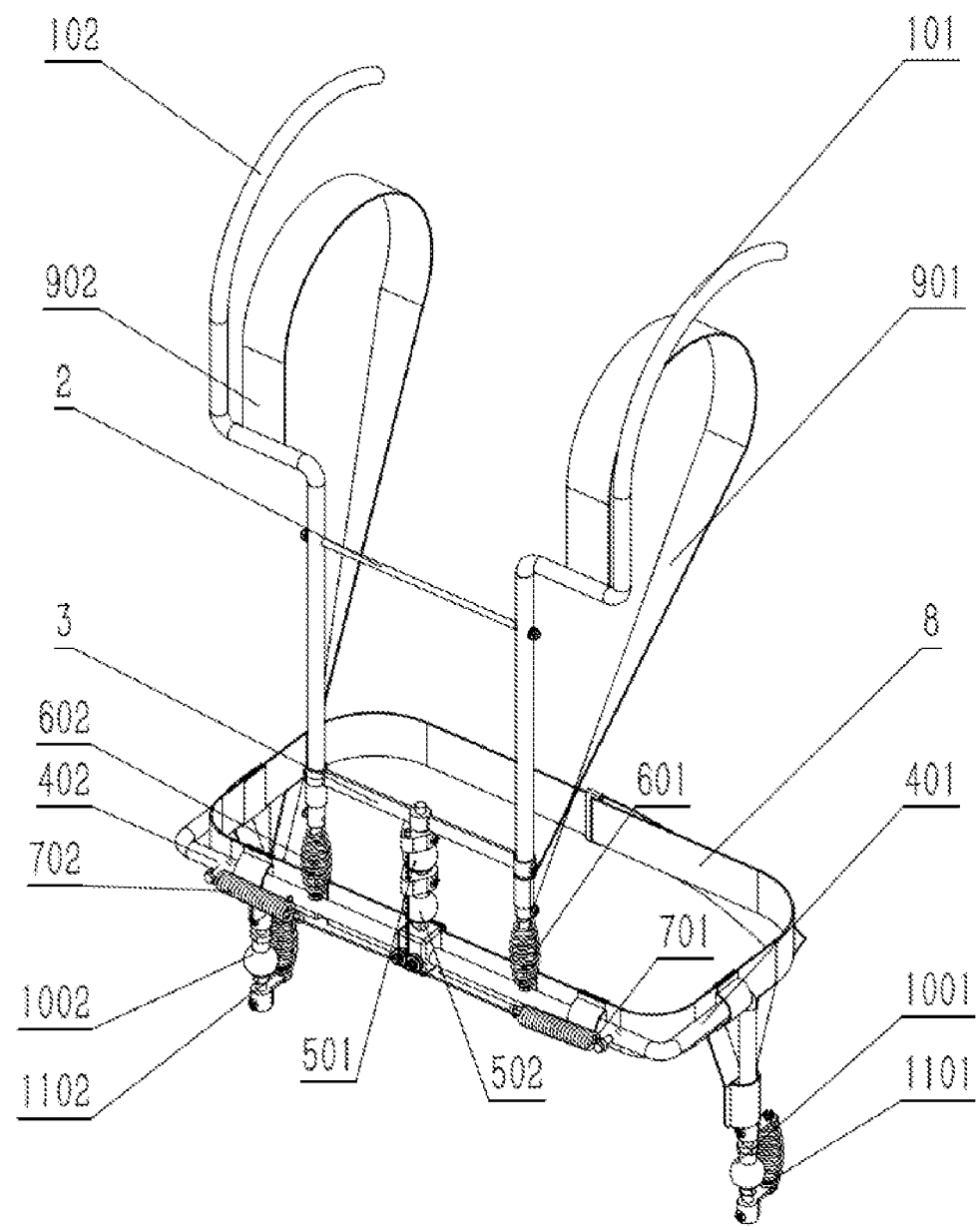
FIG. 2 is a detailed schematic diagram of a trunk support portion.

As shown in FIG. 1, the present invention discloses an exoskeleton device for supporting anti-radiation protective clothing. The exoskeleton device includes a pair of back support rods 101 and 102, a fixed transverse rod 2, a guide member 3, a pair of waist support rods 401 and 402, spherical hinges 501 and 502, two middle-convex drum-shaped springs 601 and 602, two straight cylindrical tension springs 701 and 702, a flexible waist strap 8, a pair of flexible straps 901 and 902, spherical hinges 1001 and 1002, middle-convex drum-shaped springs 1101 and 1102, straight thigh support rods 1201 and 1202, flexible thigh binding sleeves 1301 and 1302, joint bearings 1401 and 1402, spring compression rods 1501 and 1502, sliding members 1601 and 1602, straight calf support rods 1701 and 1702, straight sliding support rods 1801 and 1802, flexible calf binding sleeves 1901 and 1902, anklebone rotating members 2001 and 2002, flexible anklebone binding sleeves 2101 and 2102, and plantar support members 2201 and 2202. As shown in FIG. 2, the fixed transverse rod 2 is fixed to the pair of back support rods 101 and 102 though threads, to keep the back support rods to be parallel and stable; the back support rods 101 and 102 are respectively connected to the waist support rods 401 and 402 through the drum-shaped springs 601 and 602; the guide member 3 is connected to the waist support rods through the spherical hinges 501 and 502; the straight cylindrical tension springs 701 and 702 are connected to an upper end of the spherical hinge 501 through a steel rope; and the flexible straps 901 and 902 and the waist strap 8 are respectively sleeved on the back support rods 101 and 102 and the waist support rods.

The waist support rods 401 and 402 are respectively connected to the straight thigh support rods 1201 and 1202 through the spherical hinges 1001 and 1002, and the drum-shaped springs 1101 and 1102 that are in parallel with the spherical hinges 1001 and 1002 are both fixed through bolts; and the flexible thigh binding sleeves 1301 and 1302 are respectively fixed to the straight thigh support rods 1201 and 1202 through bolts.

Figure 3:
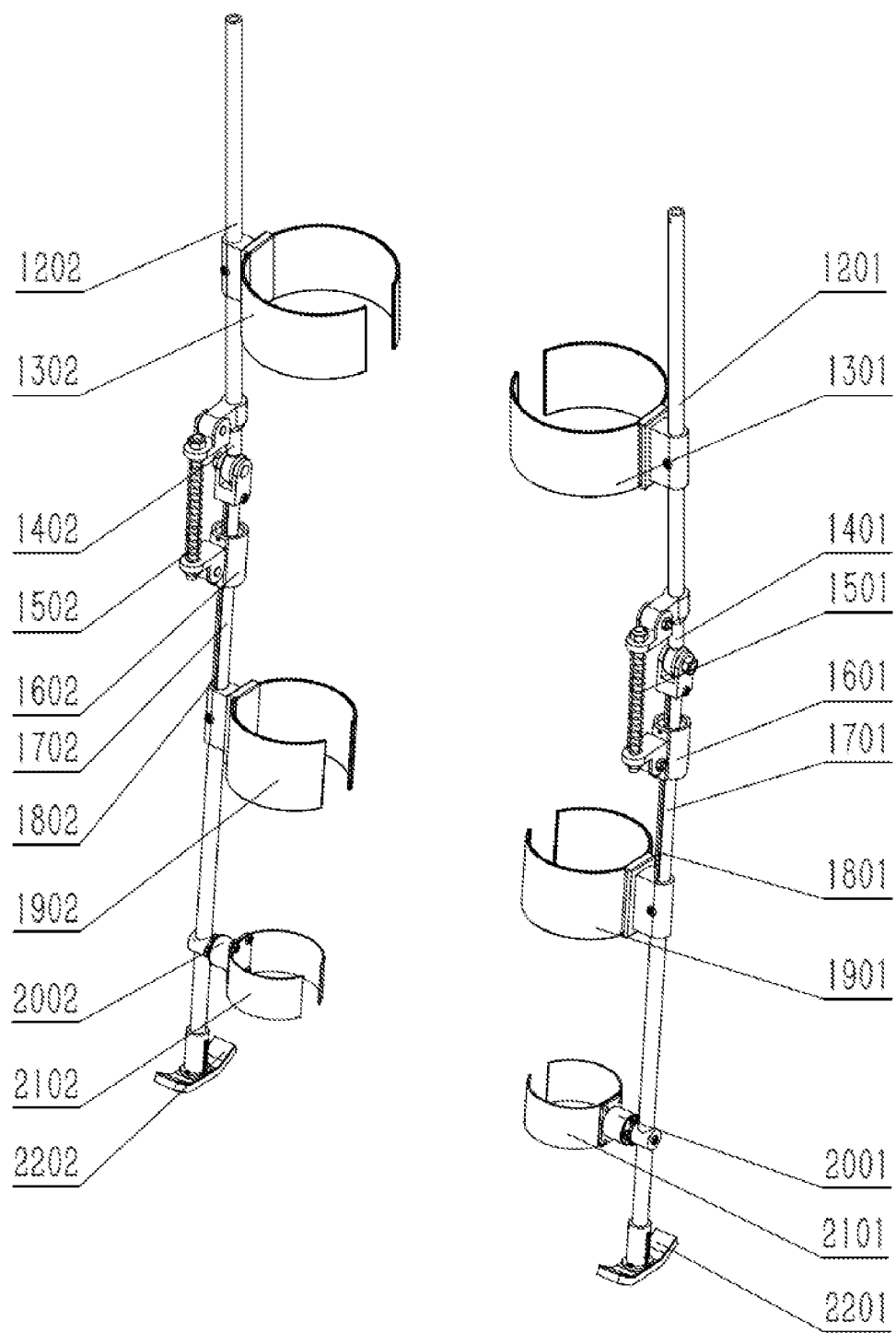
FIG. 3 is a detailed schematic diagram of a lower limb support portion.

As shown in FIG. 3, the straight thigh support rods 1201 and 1202 and the straight calf support rods 1701 and 1702 are respectively hinged by joint bearings 1401 and 1402; upper ends of the spring compression rods 1501 and 1502 in parallel with the hinges of the joint bearings are respectively connected to the straight thigh support rods 1201 and 1202 through the hinges, and lower ends are respectively connected to the sliding members 1601 and 1602; the sliding members 1601 and 1602 are respectively fixedly connected to the straight sliding support rods 1801 and 1802 through pins, and are slidably cooperated with the straight calf support rods 1701 and 1702; and the straight sliding support rods 1801 and 1802 are slidably cooperated with and connected to the straight calf support rods 1701 and 1702.

The flexible calf binding sleeves 1901 and 1902 are respectively fixed to the straight calf support rods 1701 and 1702 through bolts; the flexible anklebone binding sleeves 2101 and 2102 are respectively fixed to the anklebone rotating members 2001 and 2002 through bolts; the anklebone rotating members 2001 and 2002 are fastened with the straight calf support rods 1701 and 1702 through bolts; and the plantar support members 2201 and 2202 are respectively fixed to the straight calf support rods 1701 and 1702 through bolts.

As a preferred implementation of the present invention, the exoskeleton device for supporting anti-radiation protective clothing includes the following members.

A shoulder mechanism worn on a shoulder includes a pair of back support rods 101 and 102, a fixed transverse rod 2 and a guide member 3 arranged between the back support rods 101 and 102, and a pair of flexible straps 901 and 902 fixed to the back support rods 101 and 102, the guide member 3 is located below the fixed transverse rod 2, left and right ends of the fixed transverse rod 2 are respectively fixed to the back support rods 101 and 102 at left and right sides, and left and right ends of the guide member 3 are respectively slidably sleeved on the back support rods 101, 102 at the left and right sides.

A waist mechanism worn on a waist includes waist support rods 401 and 402, a flexible waist strap 8 installed on the waist support rods 401 and 402, and two straight cylindrical tension springs 701 and 702 with one of the ends thereof being respectively fixed to the left and right sides of the waist support rods 401 and 402, the back support rods 101 and 102 are respectively fixed to front ends of the waist support rods 401 and 402 through two middle-convex drum-shaped springs 601 and 602, the guide member 3 is fixed to the front ends of the waist support rods 401, 402 through two spherical hinges 501 and 502 that are disposed vertically and located between the two middle-convex drum-shaped springs 601 and 602, and the other ends of the straight cylindrical tension springs 701 and 702 are respectively connected to an upper end of the spherical hinge 501 above through a steel rope.

A leg mechanism worn on a leg includes straight thigh support rods 1201 and 1202 and automatic switching devices, with the straight thigh support rods 1201 and 1202 being arranged at upper ends of the automatic switching devices and the automatic switching devices being arranged between the straight thigh support rods 1201 and 1202 and straight calf support rods 1701 and 1702, the leg mechanism further includes fasteners arranged on upper ends of the automatic switching devices, joint bearings 1401 and 1402 arranged on lower ends of the fasteners, bearing supports arranged at lower ends of the joint bearings 1401 and 1402, sliding members 1601 and 1602 arranged at lower ends of the bearing supports, sliding bearings arranged in the sliding members 1601 and 1602, upper hinges and lower hinges respectively hingedly connected to the fasteners and the sliding members 1601 and 1602, compression springs arranged between the upper hinges and the lower hinges and spring compression rods 1501 and 1502 passing through the upper hinges, the compression springs, and the lower hinges in sequence, where lower ends of the straight thigh support rods 1201 and 1202 and upper ends of the joint bearings 1401 and 1402 are fixedly connected through upper thread rods, the upper thread rods pass through through holes in the fasteners, the lower ends of the joint bearings 1401 and 1402 are rotatably installed on the bearing supports, rod caps are arranged at upper ends of the spring compression rods 1501 and 1502 and nuts are installed on lower ends, and the upper hinges and the lower hinges are limited between the rod caps and the nuts of the spring compression rods 1501 and 1502; for the straight calf support rods 1701 and 1702 arranged at the lower ends of the bearing supports, the straight calf support rods 1701 and 1702 pass through insides of the sliding bearings, upper ends of the straight calf support rods 1701 and 1702 are fixed in countersunk through holes of bases of the bearing supports through lower thread rods; straight sliding support rods 1801 and 1802 are arranged inside the straight calf support rods 1701 and 1702 and can slide up and down in the straight calf support rods 1701 and 1702, two corresponding installation holes are respectively formed in upper ends of the straight sliding support rods 1801 and 1802 and upper ends of the sliding member 1601 and 1602, upper pin shafts and lower pin shafts are inserted into the two installation holes to fix the straight sliding support rods 1801 and 1802 and the sliding member 1601 and 1602, and the sliding bearings are limited between the upper pin shafts and the lower pin shafts; sliding slots are formed in sides of the straight calf support rods 1701 and 1702, the upper pin shafts and the lower pin shafts pass through the installation holes of the sliding members 1601 and 1602 in sequence, and the sliding slots and the straight sliding support rods 1801 and 1802 in sequence, and slide up and down in the sliding slots.

The working process of the exoskeleton device is described as follows. When the exoskeleton device is worn on a human body, the anti-radiation protective clothing is "put on" the exoskeleton. When the human body is erect, the back support rods bear the weight of the anti-radiation protective clothing at the shoulder and transmit the weight to the ground through the hinges and support rods. When the human body bends over for working, the straight cylindrical tension springs generate a pulling force and the drum-shaped springs at the hip joint are pressed, to provide assistance effects for the upper part of the human body. When the human body squats, the spring compression rods at the knee joints will work to provide assistance for the knee joints, to reduce a burden on the knee joints of the human body.

When the human body walks normally, the plantar sliding support rods leave the ground, the sliding members become free ends, the spring rods do not work when the knee joints bend over, to generate no resistance against the legs of the human body, and this is exactly the difference between a knee joint mechanism and a common passive assistance structure for a lower limb.

What is claimed is:

1. An exoskeleton device for supporting anti-radiation protective clothing, comprising:

a shoulder mechanism worn on a shoulder, wherein the shoulder mechanism comprises a pair of back support rods, a fixed transverse rod and a guide member arranged between the back support rods, and a pair of flexible straps fixed to the back support rods, wherein the guide member is located below the fixed transverse rod, left and right ends of the fixed transverse rod are respectively fixed to the back support rods at left and right sides, and left and right ends of the guide member are respectively slidably sleeved on the back support rods at left and right sides;

a waist mechanism worn on a waist, wherein the waist mechanism comprises waist support rods, a flexible waist strap installed on the waist support rods, and two straight cylindrical tension springs with a first of a first straight cylindrical tension spring being fixed to a left or a right side of the waist support rods and a first end of a second straight cylindrical tension spring being fixed to an opposite side, wherein the back support rods are respectively fixed to front ends of the waist support rods through two middle-convex drum-shaped springs, the guide member is fixed to front ends of the waist support rods through two first spherical hinges, the two first spherical hinges are disposed vertically and located between the two middle-convex drum-shaped springs and second ends of the straight cylindrical tension springs are respectively connected to an upper end of one of the two first spherical hinges located above the straight cylindrical tension springs through a steel rope; and a leg mechanism worn on a leg, wherein the leg mechanism comprises straight thigh support rods and automatic switching devices, the straight thigh support rods are arranged at upper ends of the automatic switching devices and the automatic switching devices are arranged between the straight thigh support rods and straight calf support rods, the leg mechanism further comprises fasteners arranged on upper ends of the automatic switching devices, joint bearings arranged on the lower ends of the fasteners, bearing supports arranged at lower ends of the joint bearings, sliding members arranged at lower ends of the bearing supports, sliding bearings arranged in the sliding members, upper hinges and lower hinges respectively hingedly connected to the fasteners and the sliding members compression springs arranged between the upper hinges and the lower hinges and spring compression rods passing through the upper hinges, the compression springs, and the lower hinges in sequence, lower ends of the straight thigh support rods and upper ends of the joint bearings are fixedly connected through upper thread rods, the upper thread rods penetrate through holes in the fasteners, lower ends of the joint bearings are rotatably installed on the bearing supports, rod caps are arranged at upper ends of the spring compression rods and nuts are installed on lower ends of the spring compression rods, the upper hinges and the lower hinges are limited between the rod caps and the nuts of the spring compression rods; for the straight calf support rods arranged at the lower ends of the bearing supports, the straight calf support rods pass through insides of the sliding bearings, upper ends of the straight calf support rods are fixed in countersunk through holes of bases of the bearing supports by lower thread rods; straight sliding support rods are arranged inside the straight calf support rods and slide up and down in the straight calf support rods, two corresponding installation holes are respectively formed in upper ends of the straight sliding support rods and upper ends of the sliding member, upper pin shafts and lower pin shafts are inserted into the two installation holes to fix the straight sliding support rods and the sliding member, and the sliding bearings are limited between the upper pin shafts and the lower pin shafts; sliding slots are formed in sides of the straight calf support rods, the upper pin shafts and the lower pin shafts penetrate the installation holes of the sliding members, the sliding slots and the straight sliding support rods in sequence, and slide up and down in the sliding slots.

2. The exoskeleton device for supporting anti-radiation protective clothing according to claim 1, wherein the waist support rods and the straight thigh support rods are connected through second spherical hinges, and the exoskeleton device further comprises drum-shaped springs respectively fixed to two ends of each of the second spherical hinges.

3. The exoskeleton device for supporting anti-radiation protective clothing according to claim 1, further comprising flexible thigh binding sleeves, respectively fixed to the straight thigh support rods.

4. The exoskeleton device for supporting anti-radiation protective clothing according to claim 1, further comprising flexible calf binding sleeves, respectively fixed to the straight calf support rods.

5. The exoskeleton device for supporting anti-radiation protective clothing according to claim 1, further comprising flexible anklebone binding sleeves, respectively hingedly connected to the straight calf support rods through anklebone rotating members.

* * * * *